(12) United States Patent
Leidecker et al.

(10) Patent No.: US 9,863,491 B2
(45) Date of Patent: Jan. 9, 2018

(54) PISTON FOR A BRAKE CALIPER OF A DISK BRAKE

(75) Inventors: Norbert Leidecker, Eschborn (DE); Matthias Würz, Oberursel (DE); Jürgen Balz, Hünstetten-Oberlibbach (DE); Dieter Füller, Nauheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 265 days.

(21) Appl. No.: 14/342,056

(22) PCT Filed: Aug. 16, 2012

(86) PCT No.: PCT/EP2012/066035
§ 371 (c)(1), (2), (4) Date: Feb. 28, 2014

(87) PCT Pub. No.: WO2013/034417
PCT Pub. Date: Mar. 14, 2013

(65) Prior Publication Data
US 2014/0208940 A1    Jul. 31, 2014

(30) Foreign Application Priority Data

Sep. 6, 2011 (DE) .......................... 10 2011 082 144
Feb. 29, 2012 (DE) .......................... 10 2012 203 162

(51) Int. Cl.
*F16D 65/00* (2006.01)
*F16J 1/00* (2006.01)
(Continued)

(52) U.S. Cl.
CPC ........... *F16D 65/005* (2013.01); *F16D 65/18* (2013.01); *F16J 1/001* (2013.01); *F16J 1/005* (2013.01);
(Continued)

(58) Field of Classification Search
CPC ........ F16J 1/10; F16J 1/006; F01B 2009/061; B60T 13/588; B60T 13/667
See application file for complete search history.

(56) References Cited

U.S. PATENT DOCUMENTS 4,742,735 A * 5/1988 Stencel .................... F16B 31/02
81/121.1
5,107,967 A * 4/1992 Fujita ...................... B60T 1/065
188/156
(Continued)

FOREIGN PATENT DOCUMENTS

DE           195 34 220 A1    3/1997
DE    10 2007 051 456 A1     4/2009
(Continued)

OTHER PUBLICATIONS

Japanese Office Action dated Apr. 7, 2015 in Japanese Application No. 2014-528923.
(Continued)

*Primary Examiner* — Thomas E Lazo
*Assistant Examiner* — Matthew Wiblin
(74) *Attorney, Agent, or Firm* — RatnerPrestia

(57) ABSTRACT

The invention relates to a piston for a brake caliper, which can be actuated in combined fashion, of a disk brake, which piston 1 is produced by shaping processes from a metallic material, in particular from a planar metal sheet, and which piston 1 is formed as a pot which is open on one side and which has a longitudinal axis, a wall and a piston crown, and which piston has a twist prevention facility for a drive nut. The invention is based on the problem of providing a robust piston construction which is better capable of tolerating erroneous repair work. To solve the problem, it is proposed that the twist prevention facility has, between the piston and (Continued)

drive nut, at least one reinforcement for protecting against plastic deformation of at least one driver.

6 Claims, 3 Drawing Sheets

(51) Int. Cl.
| *F16D 65/18* | (2006.01) |
| *F16D 121/04* | (2012.01) |
| *F16D 121/24* | (2012.01) |
| *F16D 123/00* | (2012.01) |
| *F16D 125/06* | (2012.01) |

(52) U.S. Cl.
CPC ...... *F16D 2121/04* (2013.01); *F16D 2121/24* (2013.01); *F16D 2123/00* (2013.01); *F16D 2125/06* (2013.01); *F16D 2200/0004* (2013.01)

(56) References Cited

U.S. PATENT DOCUMENTS

| 5,161,650 | A | * | 11/1992 | Taig | B60T 13/12 |
| | | | | | 188/71.9 |
| 5,348,123 | A | * | 9/1994 | Takahashi | B60T 7/04 |
| | | | | | 188/162 |
| 5,782,322 | A | * | 7/1998 | Hauck | F16D 65/18 |
| | | | | | 188/162 |
| 5,809,838 | A | * | 9/1998 | Miyaguchi | F16H 25/2214 |
| | | | | | 74/89.44 |
| 6,085,636 | A | | 7/2000 | Rückert et al. | |
| 7,942,247 | B2 | * | 5/2011 | Adachi | B60T 13/741 |
| | | | | | 188/156 |
| 8,869,677 | B2 | | 10/2014 | Koch | |
| 9,347,536 | B2 | * | 5/2016 | Kreutzer | F16H 25/2214 |
| 2004/0016324 | A1 | * | 1/2004 | Wright | B25B 13/065 |
| | | | | | 81/121.1 |
| 2008/0314239 | A1 | * | 12/2008 | Leidecker | B23P 15/10 |
| | | | | | 92/169.1 |
| 2009/0133975 | A1 | | 5/2009 | Gilles | |
| 2009/0283371 | A1 | * | 11/2009 | Winkler | F16D 65/18 |
| | | | | | 188/72.6 |
| 2011/0048869 | A1 | | 3/2011 | Schupska et al. | |
| 2011/0315007 | A1 | * | 12/2011 | Koch | F16D 65/18 |
| | | | | | 92/172 |
| 2014/0158480 | A1 | * | 6/2014 | Qian | F16D 55/226 |
| | | | | | 188/72.6 |

FOREIGN PATENT DOCUMENTS

| DE | 10 2009 019 662 A1 | 11/2009 |
| DE | 10 2009 017 167 A1 | 12/2009 |
| DE | 10 2010 030 277 A1 | 2/2011 |
| JP | 2011501073 | 1/2011 |
| WO | WO 2007/036357 | 4/2007 |

OTHER PUBLICATIONS

International Search Report dated Jan. 3, 2013 for International Application No. PCT/EP2012/066035.
German Search Report dated Sep. 3, 2012.

* cited by examiner

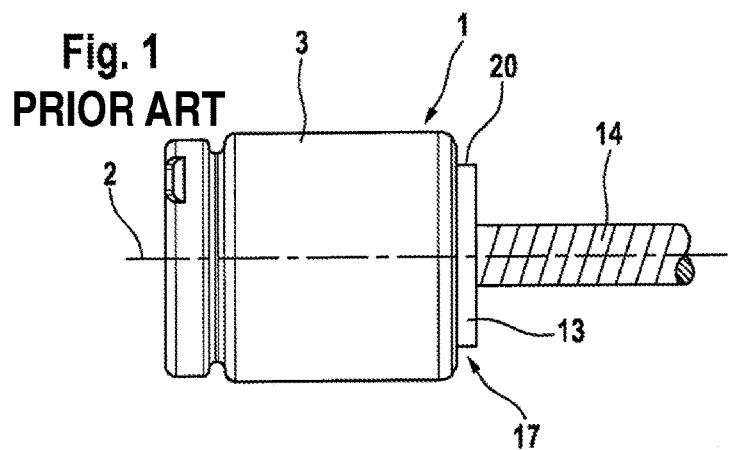
Fig. 1 PRIOR ART
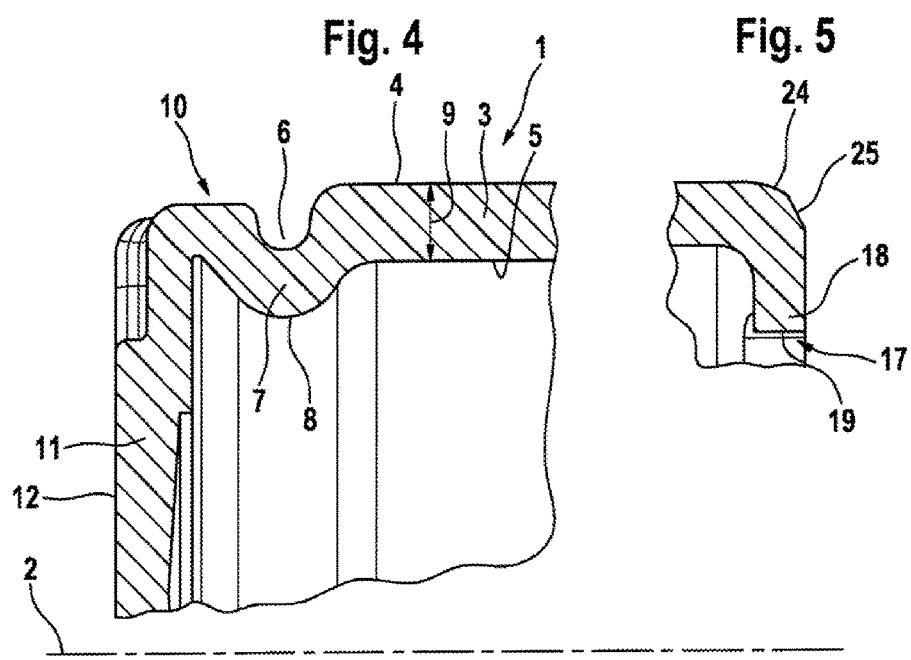
Fig. 4
Fig. 5

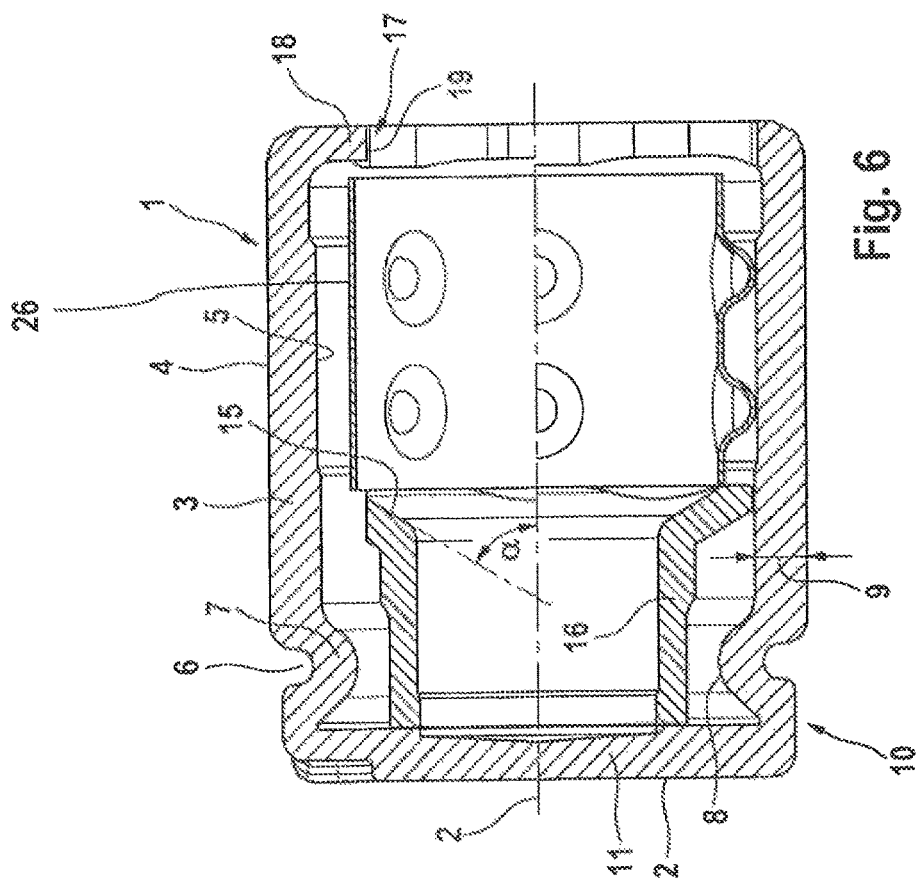
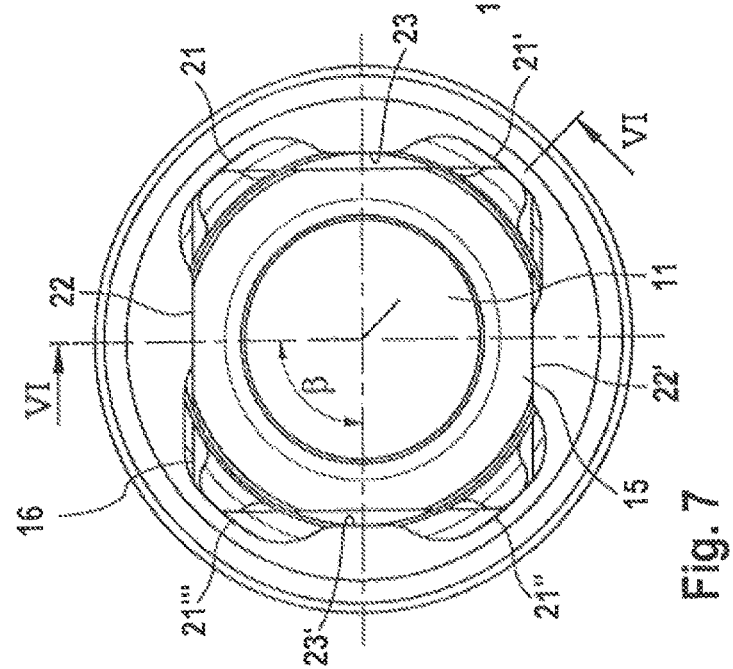

PISTON FOR A BRAKE CALIPER OF A DISK BRAKE

CROSS REFERENCE TO RELATED APPLICATIONS

This application is the U.S. National Phase Application of PCT International Application No. PCT/EP2012/066035, filed Aug. 16, 2012, which claims priority to German Patent Application No. 10 2011 082 144.9, filed Sep. 6, 2011 and German Patent Application No. 10 2012 203 162.6, filed Feb. 29, 2012, the contents of such applications are being incorporated by reference herein.

FIELD OF THE INVENTION

The invention relates to a piston for a brake caliper of a disk brake, which piston is produced by forming processes from a metallic material, in particular from a flat metal sheet. The piston is designed as a pot which is open on one side and which has a longitudinal axis, a wall and a piston head. A piston of this kind is mounted in a cylinder of the brake caliper in such a way that it can move in the longitudinal direction, and, in the region of the piston head, it can be placed against a brake pad by means of an axial contact surface. When the piston is subjected to pressure by a hydraulic fluid, the piston moves in the cylinder and presses the brake pad against a brake disk. Furthermore, the piston can also be acted upon mechanically by means of a drive nut.

BACKGROUND OF THE INVENTION

A piston is known from WO 2007/036357 A1, which is incorporated by reference. In this case, the piston is provided in a disk brake in such a way as to be movable electromechanically and hydraulically. In the case of electromechanical actuation, a drive spindle is set in rotation by an electric motor via a transmission. The drive spindle is in engagement with a drive nut, which is arranged in a manner secured against twisting in the piston. This enables the piston/drive nut unit to be moved axially in the cylinder. The drive nut can be placed axially against a conical surface in the piston and in this way transmits the axial movement to the piston and the brake pad.

In the case of parking brake calipers with "combined actuation" in parking brake systems, conventional brake caliper embodiments containing a mechanical actuating device with an integrated telescoping device for successive compensation of brake pad wear are taken to be fundamentally distinct. In this case, each replacement of worn brake pads requires manual resetting by the performance of a mechanical rotary return movement at the piston, thus turning a threaded means of the readjustment device back into an initial position. As a result, the brake piston is thereby moved into a rear end position, and the new brake pads can be installed.

In addition, there are caliper embodiments with an electromechanical actuator integrated into the caliper (electric parking brake) containing an electronic pad wear compensation system, and wherein an electronic mode is provided for moving the actuator electromechanically into a predetermined position for changing the brake pad. This eliminates the need for manual resetting. However, the decades-old manual resetting facility should be retained, at least as a fallback solution. There can be problems in the case of these brake calipers with situations in which there is an attempt at a continued manual resetting movement, even after the rear end position has been reached. This is because an unnecessary continuation of the operation merely promotes unwanted wear without having any positive effects. In this embodiment therefore—as in the case of all maintenance work on a brake system—special care and caution is required.

SUMMARY OF THE INVENTION

Unfortunately, unauthorized changing of the brake pad or human error when changing a brake pad cannot be completely excluded, and therefore it is the underlying aim of the invention to provide a solution which is of robust design and as far as possible unamenable to unauthorized or inexpertly performed changing of the brake pad.

This aim is achieved by the features of the main claim by virtue of the fact that a fundamentally known twist prevention device between a piston and a drive nut of an electromechanically actuable brake caliper is equipped in a completely novel manner with an integrated reinforcement to provide protection against plastic deformation of at least one driving feature, in particular to protect a force engagement surface. In this case, the reinforcement is preferably designed as an asymmetrically incongruent, that is to say geometrically non-congruent, torsionally rigid profiling having at least one clearance cut to avoid unwanted deformation between the piston and the nut. For example, a rim of the piston has for this purpose an asymmetric profiling with one or more clearance cuts, while a profiling of the nut can be of symmetrical design. According to an aspect of the invention, deformation, seizure, abrasion and similarly disadvantageous behavior between twist prevention means is necessarily avoided by means of a design which is embodied in a fault tolerant manner.

BRIEF DESCRIPTION OF THE DRAWINGS

Further details of the invention will emerge from dependent claims together with the description with reference to the drawing.

In the drawing:

FIG. 1 shows an elevation of a known piston together with a drive nut and a drive spindle, FIG. 4 shows an enlarged detail of FIG. 2, FIG. 5 shows an enlarged detail of FIG. 2, FIG. 6 shows a piston module on an enlarged scale, in section and with inserts, and FIG. 7 shows a plan view of the open end of the piston module in FIG. 6.

DETAILED DESCRIPTION

Figure 2:
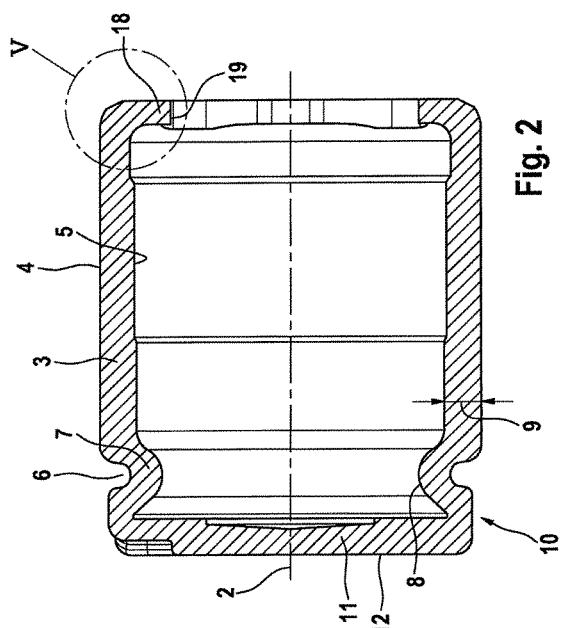
FIG. 2 shows a piston according to the invention on an enlarged scale and in section.
Figure 3:
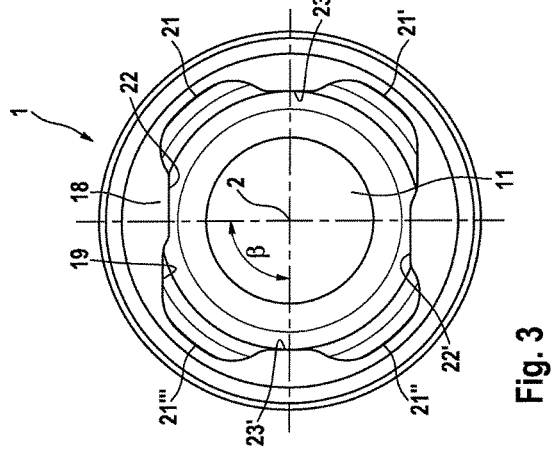
FIG. 3 shows a plan view of the open end of the piston in FIG. 2.

A brake caliper capable of combined actuation in an electrohydraulic motor vehicle brake has a piston 1 having a drive spindle 14 and having a drive nut 13. The piston 1 is designed as a pot which is open on one side and has a wall 3 and a piston head 11, wherein the piston head 11 can be placed against a brake pad (not shown) on the closed side of the piston 1 by means of an axial contact surface 12. An encircling groove 6, which, in the installed state (piston 1 in the brake caliper), serves to receive a piston protection cap (not shown), is rolled into an outer side 4 of the wall 3, in the vicinity of the contact surface 12. The contour of the rolled-in groove 6 continues through the entire cross section of the wall 3 and thereby gives rise to a shoulder 7 on an inner side 5 of the wall 3 of the piston 1. A conical surface 15 to provide axial support for the conically configured drive nut 13 on the piston head 11 is provided on an insert 16 (cup) in the piston 1. Consequently, the piston 1 is designed as a multi-part piston module which has the insert 16, which is arranged as a distinct component in the piston 1 and is preferably obtained by forming a flat metal sheet.

The cup-type insert 16 is supported flat against the piston head 11 in an axial direction. In this case, the conical surface 15 of the cup preferably encloses an angle α of about 60° together with the longitudinal axis 2 in an axial direction.

The piston 1 and the drive nut 13 are connected to one another in a manner fixed against relative rotation with respect to the longitudinal axis 2. The piston 1 or the drive nut 13 are secured against twisting in the brake caliper housing in a manner not shown.

In the case of parking brake actuation of the disk brake, the drive spindle 14 arranged in the drive nut 13 is rotated. This is accomplished, for example, by means of an electric motor by way of a transmission connected to the output, or by a lever mechanism with a cable connected thereto, and manual or central-actuator actuation. Since the drive spindle 14 and the drive nut 13 are preferably provided with a ball screw, the rotary movement of the drive spindle 14 is converted with a high efficiency by the ball screw into an axial movement of the drive nut 13. Consequently, the drive nut 13 rests against the piston 1 and moves the latter. In principle, however, nut/screw drives without the use of rolling contact elements are also possible.

A twist prevention device 17 according to an aspect of the invention between the piston 1 and the drive nut 13 is implemented as follows. Provided at an open end of the piston 1 is a rim 18 which points radially inward and has an end face which is provided with an integrally formed contour that, together with a mating contour of the drive nut 13, forms a positive twist prevention device 17 between the drive nut 13 and the piston 1 in the form of a plurality of positive driving features.

In this case, the twist prevention device 17 between the piston 1 and the drive nut 13 has an integrated reinforcement to provide protection against plastic deformation of the driving features involved. In this case, the driving features are preferably configured as force engagement surfaces in the form of paired flats. Overloading or plastic deformation, or deformation involving the formation of shavings, of the driving features is thereby avoided. In this case, the reinforcement is preferably provided as an asymmetrically incongruent, that is to say geometrically non-congruent, noncircular contour and mating contour 19, 20 with torsionally rigid profiling on the adjacent force engagement surfaces, and wherein at least one clearance cut 21 is provided to avoid unwanted deformation.

For example, the twist prevention device 17 has, in the region of the rim 18 of the piston 1, an asymmetric internal profiling having a plurality of generous clearance cuts 21, 21', 21", 21''' provided in the form of clover leafs as a clearance for corners or edges. In contrast, a mating contour 20 having an external profiling on the drive nut 13 can be of symmetrical design. In addition, oppositely situated supporting features, contact features and/or force engagement surfaces between the piston 1 and the drive nut 13 can extend parallel to one another.

The driving features are preferably configured as pairs of flats 22, 22' which are arranged parallel to one another, and pairs of supporting surfaces 23, 23' offset thereto at regular intervals by an angle (90°) additionally center the components involved relative to one another. As a result, the profiling described provides defined contact between the components involved, avoiding damage. A tendency to rattle and noise generation are prevented. The clearance cuts 21, 21', 21", 21''', which are arranged so as to occupy a large space at the rim 18, provide a vehicle manufacturer with the possibility of accelerated filling of the brake system with brake fluid at the end of the assembly line. Moreover, accelerated bleeding of the brake system is advantageously made possible. Starting from the concentric outer side 4 of the wall 3, the rim 18 is formed by a radius 24 and an adjoining chamfer 25, adjoining which is a portion which points radially inward at right angles and which at least partially overlaps the insert 16.

Finally, the invention relates to a piston module having a piston 1 with at least one insert 16 and a compensating element, 26, and wherein the rim 18, which points radially inward in the direction of longitudinal axis 2, overlaps the insert 16 at least partially in a positive manner. Consequently, the rim 18 serves to supplement the positive securing of the position of the insert 16 in the piston 1.

LIST OF REFERENCE SIGNS 1 piston
2 longitudinal axis
3 wall
4 outer side
5 inner side
6 groove
7 shoulder
8 shoulder surface
9 cross-sectional area
10 transition zone
11 piston head
12 contact surface
13 drive nut
14 drive spindle
15 conical surface
16 insert
17 twist prevention device
18 rim
19 contour
20 mating contour
21 clearance cut
22 pair of flats
23 pair of supporting surfaces
24 radius
25 chamfer
α angle
β angle

The invention claimed is:

1. A piston for a brake caliper of a disk brake, which piston is produced by forming processes from a flat metal sheet, and which piston is designed as a pot which is open on one side and which has a longitudinal axis, a wall and a piston head, and can be placed against a brake pad by an axial contact surface, and which piston has at least one twist prevention means between the piston and a drive nut, wherein the twist prevention means has at least one integrated reinforcement, which serves to protect the piston against plastic deformation by the drive nut in that a rim of the piston has a profiling which points radially inward asymmetrically in the direction of the longitudinal axis to define a contour, and an associated profiling of the drive nut is of symmetrical design to define a mating contour, wherein the contour on the piston forms at least two pairs of flat surfaces, the surfaces in each pair being arranged parallel to one another and positioned diametrically opposite one another, wherein the flat surfaces of one of the at least two pairs are positioned at a first radial distance from an axial center of the piston, the flat surfaces of another one of the at least two pairs are positioned at a second radial distance from the axial center of the piston different from the first radial distance, and the pairs of flat surfaces are positioned at a common location along an axial direction of the piston, wherein the contour on the piston includes a plurality of clearance cuts between the at least two pairs of flat surfaces, the clearance cuts extending radially outward from the at least two pairs of flat surfaces, and wherein the mating contour on the drive nut forms a plurality of projections extending into respective ones of the plurality of clearance cuts, each projection contacting a radially outer surface of the respective clearance cut.

2. The piston as claimed in claim 1, wherein the reinforcement is designed as a geometrically non-congruent, torsionally rigid profiling of the contour on the piston and/or of the mating contour of a drive nut.

3. The piston as claimed in claim 2, wherein the contour on the piston and the mating contour on the drive nut each form at least two pairs of supporting surfaces, which are arranged parallel to one another and positioned diametrically opposite one another.

4. The piston as claimed in claim 3, wherein pairs of supporting surfaces and pairs of flats are provided alternately and offset at regular intervals at an angle ($\beta$) to one another.

5. The piston as claimed in claim 2, wherein the contour on the rim of the piston is designed as an inner contour of asymmetric clover leaf shape.

6. The piston as claimed in claim 1, wherein the piston receives at least one insert, and wherein the rim overlaps the insert at least partially in a positive manner.

* * * * *